US009263174B2

(12) United States Patent
Pattayil et al.

(10) Patent No.: US 9,263,174 B2
(45) Date of Patent: Feb. 16, 2016

(54) SINTERED COBALT FERRITES COMPOSITE MATERIAL WITH HIGH MAGNETOSTRICTION

(71) Applicant: Council of Scientific and Industrial Research, New Delhi (IN)

(72) Inventors: Alias Joy Pattayil, Pune (IN); Mohaideen Kamal Khaja, Pune (IN)

(73) Assignee: Council of Scientific and Industrial Research (IN)

( * ) Notice: Subject to any disclaimer, the term of this patent is extended or adjusted under 35 U.S.C. 154(b) by 20 days.

(21) Appl. No.: 14/372,644

(22) PCT Filed: Jan. 17, 2013

(86) PCT No.: PCT/IN2013/000029
§ 371 (c)(1),
(2) Date: Jul. 16, 2014

(87) PCT Pub. No.: WO2013/108269
PCT Pub. Date: Jul. 25, 2013

(65) Prior Publication Data
US 2015/0017443 A1   Jan. 15, 2015

(30) Foreign Application Priority Data

Jan. 17, 2012  (IN) .......................... 0137/DEL/2012

(51) Int. Cl.
| H01F 1/34 | (2006.01) |
| C04B 35/26 | (2006.01) |
| C04B 35/626 | (2006.01) |
| C04B 35/64 | (2006.01) |
| H01F 1/10 | (2006.01) |
| C01G 51/00 | (2006.01) |
| H01F 41/00 | (2006.01) |
| B82Y 25/00 | (2011.01) |

(52) U.S. Cl.
CPC ................ *H01F 1/344* (2013.01); *C01G 51/40* (2013.01); *C04B 35/26* (2013.01); *C04B 35/2666* (2013.01); *C04B 35/6261* (2013.01); *C04B 35/6267* (2013.01); *C04B 35/62645* (2013.01); *C04B 35/64* (2013.01); *H01F 1/10* (2013.01); *H01F 41/00* (2013.01); *B82Y 25/00* (2013.01); *C01P 2002/60* (2013.01); *C01P 2004/64* (2013.01); *C01P 2006/42* (2013.01); *C04B 2235/3275* (2013.01); *C04B 2235/443* (2013.01); *C04B 2235/449* (2013.01); *C04B 2235/5436* (2013.01); *C04B 2235/5445* (2013.01); *C04B 2235/5454* (2013.01); *C04B 2235/5472* (2013.01); *C04B 2235/6562* (2013.01); *C04B 2235/6565* (2013.01); *C04B 2235/661* (2013.01); *C04B 2235/77* (2013.01); *C04B 2235/781* (2013.01); *C04B 2235/783* (2013.01); *C04B 2235/785* (2013.01); *C04B 2235/786* (2013.01); *Y10T 428/2982* (2015.01)

(58) Field of Classification Search
CPC .... C04B 35/26; C04B 35/64; C04B 35/2666; C04B 35/6261; C04B 35/62645; C04B 35/6267; H01F 1/344; H01F 1/10; H01F 41/00; C01G 51/40; Y10T 428/2982
USPC .......................................... 428/402; 264/611
See application file for complete search history.

(56) References Cited

U.S. PATENT DOCUMENTS

| 3,753,058 A | 8/1973 | Edson |
| 4,151,432 A | 4/1979 | Akimoto et al. |
| 4,414,510 A | 11/1983 | Milkovic |
| 5,442,966 A | 8/1995 | Hase et al. |
| 6,093,337 A * | 7/2000 | McCallum et al. ........ 252/62.55 |
| 6,352,649 B1 * | 3/2002 | McCallum et al. ........ 252/62.55 |
| 7,326,360 B1 * | 2/2008 | Jiles et al. ................ 252/62.6 |

FOREIGN PATENT DOCUMENTS

WO    WO-2013/108269    7/2013

OTHER PUBLICATIONS

Kamal khaja Mohaideen et al.,:"Enhancement in the Magnetostriction of Sintered Cobalt Ferrite . . . "ACS Appl. Mater. Interfaces, vol. 4, No. 12, Dec. 3, 2012, pp. 6421-6425.*
"International Application No. PCT/IN2013/000029, Article 19 amendments filed Jul. 23, 2013", (Jul. 23, 2013), 11 pgs.
"International Application No. PCT/IN2013/000029, International Search Report mailed May 23, 2013", (May 23, 2013), 3 pgs.
Bhame, S. D, et al., "Effect of Sintering Conditions and Microstructure on the Magnetostrictive Properties of Cobalt Ferrite", Journal of the American Ceramic Society, 91(6), (Jun. 2008), 1976-1980.
Bhame, S. D, et al., "Enhanced magnetostrictive properties of CoFe2O4 synthesized by an autocombustion method", Sensors and Actuators A: Physical, 137(2), (Jul. 4, 2007), 256-261.
Kikukawa, Nobuyuki, et al., "Synthesis and magnetic properties of nanostructured spinel ferrites using a glycine—nitrate process", Journal of Magnetism and Magnetic Materials, 284, (Dec. 2004), 206-214.

(Continued)

*Primary Examiner* — Leszek Kiliman
(74) *Attorney, Agent, or Firm* — Schwegman, Lundberg & Woessner, P.A.

(57) ABSTRACT

Disclosed herein is a sintered cobalt ferrite composite material comprising of nano and micron sized powders of cobalt ferrite with high magnetostriction. The present invention further discloses preparation of nano and micron sized powders of cobalt ferrite, in particular, the auto combustion process using glycine as fuel for preparing nano sized cobalt ferrite powders.

6 Claims, 2 Drawing Sheets

(56) References Cited

OTHER PUBLICATIONS

Mohaideen, K. K, et al., "High magnetostriction and coupling coefficient for sintered cobalt ferrite derived from superparamagnetic nanoparticles", Appl. Phys. Lett., 101, (2012), 072405.

Mohaideen, Kamal Khaja, et al., "Enhancement in the Magnetostriction of Sintered Cobalt Ferrite by Making Self-Composites from Nanocrystalline and Bulk Powders", ACS Appl. Mater. Interfaces, 4(12), (2012), 6421-6425.

Ren, Shenqiang, et al., "Magnetoelectric nano-Fe3O4/CoFe2O4∥PbZr0.53Ti0.47O3 composite", Appl. Phys. Lett., 92, (2008), 083502.

Xiao, Shun Hua, et al., "Low-temperature auto-combustion synthesis and magnetic Properties of cobalt ferrite nanopowder", Materials Chemistry and Physics, 106(1), (Nov. 15, 2007), 82-87.

"International Application No. PCT/IN2013/000029, International Preliminary Report on Patentability dated Jul. 22, 2014", 8 pgs.

"International Application No. PCT/IN2013/000029, Written Opinion mailed May 23, 2013", 7 pgs.

Lo, C. C.H., et al., "Improvement of Magnetomechancial Properties of Cobalt Ferrite by Magnetic Annealing", *IEEE Trans. Magn.*, 41(10), (Oct. 2005), 3676-3678.

\* cited by examiner

SINTERED COBALT FERRITES COMPOSITE MATERIAL WITH HIGH MAGNETOSTRICTION

PRIORITY CLAIM TO RELATED APPLICATIONS

This application is a U.S. national stage application filed under 35 U.S.C. §371 from International Application Serial No. PCT/IN2013/000029, which was filed Jan. 17, 2013, and published as WO 2013/108269 on Jul. 25, 2013, and which claims priority to Indian Application No. 0137/DEL/2012, filed Jan. 17, 2012, which applications and publication are incorporated by reference as if reproduced herein and made a part hereof in their entirety, and the benefit of priority of each of which is claimed herein.

TECHNICAL FIELD OF THE INVENTION

The present invention relates to sintered cobalt ferrite composite material comprising of nano and micron sized powders of cobalt ferrite with high magnetostriction. The present invention further relates to preparation of nano and micron sized powders of cobalt ferrite, in particular, to the auto combustion process using glycine as fuel for preparing nano sized cobalt ferrite powders.

BACKGROUND AND PRIOR ART OF THE INVENTION

Ferromagnetic materials experience a dimensional change when they are subjected to a magnetic field. This phenomenon is called magnetostriction and is attributed to the rotations of small magnetic domains in the materials which are randomly oriented when the material is not exposed to a magnetic field. These magnetostrictive effects, including the Joule effect (change in length when ferromagnetic rod is placed in longitudinal field) and the Villari effect (change in magnetic condition when a magnetized ferromagnetic rod is subjected to longitudinal stress), can be used for converting electrical power to mechanical power and vice versa. Magnetostrictive smart materials can be used in sensor applications, principally because of the possibility to sense the control signal from a distance and without wires, which is not in the case for piezo-electric ceramics. Examples of the use of ferromagnetic materials include sensors (U.S. Pat. Nos. 4,414,510 and 5,442,966), transducers (U.S. Pat. No. 3,753,058), and vibrators (U.S. Pat. No. 4,151,432).

Recently metal oxides and their nanoparticles has been the subject of much interest because of their unusual optical, electronic and magnetic properties, which often differ from that of the bulk. Due to the high surface area to volume ratio, the fine magnetic particles show different properties when compared to the bulk.

In 1972, Clark and Belson discovered giant magnetostriction in alloys of terbium, dysprosium and Iron (Terfenol-D). It is a commercially available magnetostrictive material which is an alloy containing the rare earth elements terbium and dysprosium, showing high magnetostrictive strains around 1500 ppm at a relatively low magnetic field. However, this class of mechano-magnetic materials has many disadvantages which need to be carefully considered. These include the technological challenges of delivering controlled magnetic field to magnetostrictive actuator, apart from the high cost, high brittleness, requirement of single crystals, etc. Furthermore the material generates much greater response when it is subjected to the compressive loads, and the power requirement for this class of actuators is greater than those for piezoelectric materials.

It has been shown in U.S. Pat. No. 6,093,337 that magnetostrictive materials based on cobalt ferrite can be effective for stress sensing applications and in automobile industries as an alternative to the existing power steering systems with enhanced fuel efficiency. Metal bonded polycrystalline cobalt ferrite composite is shown in U.S. Pat. No. 6,352,649 to be better than polycrystalline Terfenol-based composites in terms of the higher piezomagnetic coefficient, corrosion resistance, magnetostriction and improved magnetomechanical response. These prior arts disclose the use of ferrites as magnetostrictive materials, giving high magnetostriction as well as having economic advantage over most commonly used Terfenol-D. Also, these composites show linear magnetostrictive strains of magnitude up to 225 ppm with a rate of change of magnetostriction with applied field $(d\lambda/dH)_{max}$ of $1.3 \times 10^{-9}$ $A^{-1}$ m under no external load. They also show good corrosion resistance as well as mechanical properties, apart from its low cost. But these metal bonded ferrites are very much susceptible to magnetomechanical hysteresis.

Improvements in both magnetostriction and strain derivative of polycrystalline cobalt ferrite have been reported (D. C. Jiles et al. IEEE Trans. Magn. 41, 10 (2005)) as a result of magnetic annealing. Results show that annealing cobalt ferrite at 300° C. in air for 36 hours under a dc field of 318 kA/m induced a uniaxial anisotropy with the easy axis being along the annealing field direction. Under hard axis applied fields, the maximum magnetostriction measured along the hard axis at room temperature increased in magnitude from 200 ppm to 250 ppm after annealing, strain derivative also increased from $1.5 \times 10^{-9}$ A/m to $3.9 \times 10^{-9}$ A/m. This result shows that magnetic annealing provides an alternative means other than chemical substitution for enhancing magnetomechanical properties of cobalt ferrite, for magnetoelastic stress or torque sensing applications. Paulson et al. have studied (U.S. Pat. No. 7,326,360) the effect of substitution of Fe by Mn in $CoFe_2O_4$ and showed that the incorporation of Mn leads to a decrease in the magnetostriction value from 200 ppm to 50 ppm and Curie temperature whereas the substitution enhances the possibility of reducing the magnetomechanical hysteresis. From the application point of view of sensing devices, it is desired that the materials should exhibit no such hysteresis.

Article titled "Magnetoelectric nano-$Fe_3O_4$/$CoFe_2$//$PbZr_{0.53}Ti_{0.47}O_3$ Composite" by Shenqiang Ren et. al in Applied Physics Letters, Volume 92, Issue 8, 16 Jan. 2008, Pages 83502-83504, relates to magnetoelectric hybrid device composed of a nano-particulate magnetostrictive iron oxide-cobalt ferrite film on a piezoelectric PZT crystal serving as both substrate and straining medium. Nano-$Fe_3O_4$/$CoFe_2O_4$ particles, ranging from 5 nm to 42 nm, were prepared using a variation of the sol-gel method.

Article titled "Effect of Sintering Conditions and Microstructure on the Magnetostrictive Properties of Cobalt Ferrite" by Shekhar D. Bhame et. al. in Journal of the American Ceramic Society, Volume 91, Issue 6, 18 Dec. 2008, Pages 1976-1980, investigates the effects of sintering temperature and dwell time on the magnetostrictive properties of polycrystalline cobalt ferrite synthesized by the conventional ceramic method. The highest value of magnetostrictive strain is observed for the samples sintered at 1100° C.

An article titled "Low-temperature auto-combustion synthesis and magnetic properties of cobalt ferrite nanopowder" by Shun Hua Xiao et. al. in Materials Chemistry and Physics Volume 106, Issue 1, 15 Nov. 2007, Pages 82-87, discloses an auto-combustion method by which Cobalt ferrite ($CoFe_2O_4$) nanopowder is obtained. But the synthetic process discloses is a thermally induced redox reaction with carboxyl group as reductant and $NO_3^{-1}$ ions as oxidant. The article further states that both the saturation magnetization (Ms) and the remanent magnetization (Mr) are highly dependent upon the annealing temperature where highest coercivity (1373 Oe) is achieved for the sample annealed at 400° C.

An article titled "Enhanced magnetostrictive properties of $CoFe_2O_4$ synthesized by an autocombustion method" by the present inventor (S. D. Bhame et. al.) in Sensors and Actuators A: Physical, Volume 137, Issue 2, 18 Mar. 2007, Pages 256-261, compares the magnetostrictive properties of sintered cobalt ferrite derived from nanocrystalline powders synthesized by three different low-temperature methods (citrate, coprecipitation and autocombustion process) and the high-temperature ceramic method. Maximum magnetostriction value of 197 ppm is obtained for the sintered ferrite samples with average grain sizes of 8 μm obtained by the autocombustion process using glycine as a fuel in the ratio of 2 moles of glycine per mole of metal ion.

An article titled "Synthesis and magnetic properties of nanostructured spinel ferrites using a glycine-nitrate process" by Nobuyuki Kikukawa in Journal of Magnetism and Magnetic Materials, Volume 284, 18 Jun. 2004, Pages 206-214, discloses the preparation of zinc-substituted spinel-type ferrite fine particles of $M_{1-x}Zn_xFe_2O_4$ (M=Mg, Mn, Co, Ni, Cu, (Li, Fe) x=0-1) obtained by glycine-nitrate process by varying the ratio of glycine to nitrate (G/N ratio). The said article discloses synthesis of mono-phase spinel-type ferrites with the G/N ratio less than about 0.5 for the systems including Mg, Mg—Zn, Co, Co—Zn, Ni, Ni—Zn, (Li, Fe), and (Li, Fe)—Zn, and the ratio between 0.3 and 0.5 for Mn, and Mn—Zn systems. Further, TEM describes that the product powder consisted of agglomerates of primary particles with a typical diameter of about 50 nm for a G/N ratio of around 0.4. Table 1 of said article, discloses saturation magnetization of 79 emu/g and coercive force of 885 Oe measured for $CoFe_2O_4$ at the magnetic field of 15 kOe and at room temperature.

Cobalt ferrite is known for its high magnetostriction and there have been many attempts to make sintered polycrystalline cobalt ferrite composites with high magnetostriction at very low magnetic fields. So far there have been no studies reported on the effect of initial particle size and the resulting microstructure of the sintered material on magnetostriction. It is important to understand the effect of processing conditions, especially during sintering, in the case of nanomaterials. From the application point of view it is necessary to have very large magnetostricitive strains at room temperature. Since cobalt ferrite is an ideal material for future magnetostrictive applications because of its low cost, easy processability, etc. It is the object of the present invention to design a material based on cobalt ferrite with high magnetostriction.

In view of controlling the morphology of the powders and microstructure of the sintered products to obtain high values of saturation magnetostriction as well as to tune the low-field magnetostrictive response of polycrystalline cobalt ferrite, the present inventor further directed his research to provide improvements of both magnetostriction level and strain derivative of sintered cobalt ferrite composite material derived from nanosized and micron sized powders of cobalt ferrite, which are effective for use as magnetostrictive sensors and actuators. The further subject of the invention is to provide an improved low temperature auto-combustion process for the preparation of nanocrystalline powders.

OBJECTS OF THE INVENTION

Main object of the present invention is to provide sintered cobalt ferrite composite material derived from nanosized and micron sized powders of cobalt ferrite, which are effective for use as magnetostrictive sensors and actuators.

Another object of the present invention is to provide an improved low temperature auto-combustion process for the preparation of nanocrystalline powders.

SUMMARY OF THE INVENTION

Accordingly, present invention provides sintered cobalt ferrite composite material comprising of nano and/or micron sized powders of cobalt ferrite, wherein the ratio of nano sized powder of cobalt ferrite to the micron sized powder of cobalt ferrite in said composite is in the ratio ranging between 70:30 to 95:5 wherein said composite material having a density in the range of 79-81% compared to theoretical density and magnetostriction in the range of 340-396 ppm.

In an embodiment of the present invention, grain size of the sintered cobalt ferrite composite material is in the range of 1 to 10 μm.

In one embodiment of the present invention, particle size of micron sized powder of cobalt ferrite is in the range of 1 to 10 μm.

In another embodiment of the present invention, particle size of the nano sized powder of cobalt ferrite powder is in the range 3 to 40 nm.

In an embodiment, present invention provides a process for preparation of sintered cobalt ferrite composite material and the said process comprising the steps of:

a. dissolving cobalt nitrate ($Co(NO_3)_2.6H_2O$) and Ferric nitrate ($Fe(NO_3)_3.9H_2O$) in the molar ratio ranging between 1:1.5 to 1:2 in minimum amount of distilled water;

b. adding glycine solution in minimum amount of water with solution of step (a) wherein the metal ion to glycine is in the molar ratio of 1:0.125 to 1:1.25 followed by mixing to obtain a uniform solution;

c. evaporating the solution of step (c) on a hot plate at temperature in the range of 180 to 220° C. to obtain the thick mass which is burnt spontaneously to obtain nano sized cobalt ferrite powder;

d. mixing $CoCO_3$ and $Fe_2O_3$ in the molar ratio ranging between 1:1.5 to 1:2 followed by heating at temperature in the range of 900 to 1100° C. for period in the range of 11 to 13 hours;

e. grinding immediately the mixture as obtained in step (d) followed by heating for period in the range of 23 to 25 hrs at temperature in the range of 900 to 1100° C.;

f. heating the resulting powder at temperature in the mage of 1000 to 1100° C. for period in the range of 70 to 72 hours with two intermediate grindings to obtain micron sized cobalt ferrite powder;

g. mixing nano sized powder of cobalt ferrite as obtained in step (c) and micron sized powder of cobalt ferrite as obtained in step (f) in the ratio ranging between 70:30 to 95:5 to obtain mixture;

h. pressing the mixture as obtained in step (g) to obtain pellets; and i. sintering the pellets as obtained in step (h) at a temperature in the range of 1200-1500 C ° C. for period in the range of 5 to 60 minutes to obtain sintered cobalt ferrite composite material.

In yet another embodiment of the present invention, nano sized cobalt ferrite powder and micron sized cobalt ferrite powder further comprising pressing the cobalt ferrite powder in the form of pellets and sintering at a temperature in the range of 1200-1500° C. for 5 to 60 minutes to obtain sintered pellets.

In yet another embodiment of the present invention, sintered pellets of nano sized cobalt ferrite powder and micron sized cobalt ferrite powder has magnetostriction in the range of 200 to 310 ppm and 150-208 ppm respectively.

In yet another embodiment of the present invention, nano sized cobalt ferrite powder is prepared by an auto combustion process using glycine as a fuel, characterized in that, the metal ion to glycine is in a molar ratio of 1:0.125 to 1:1.25.

In yet another embodiment, present invention provides a process for preparation of nano sized cobalt ferrite powder comprising dual sintering of nano sized cobalt ferrite powder prepared by auto combustion process, said dual sintering process comprising;
 a. mixing metal ion, glycine in a molar ratio of 1:0.125 to 1:1.25 and subjecting to auto combustion followed by cold uniaxial pressing to form the pellets;
 b. sintering at temperature in the mage of 1100 to 1500° C., cooling, heating at lower temperature in the range of 1000-1400° C. for a period in the range of 10 to 60 hours to obtain sintered cobalt ferrite composites.

DETAILED DESCRIPTION OF THE INVENTION

Figure 1:
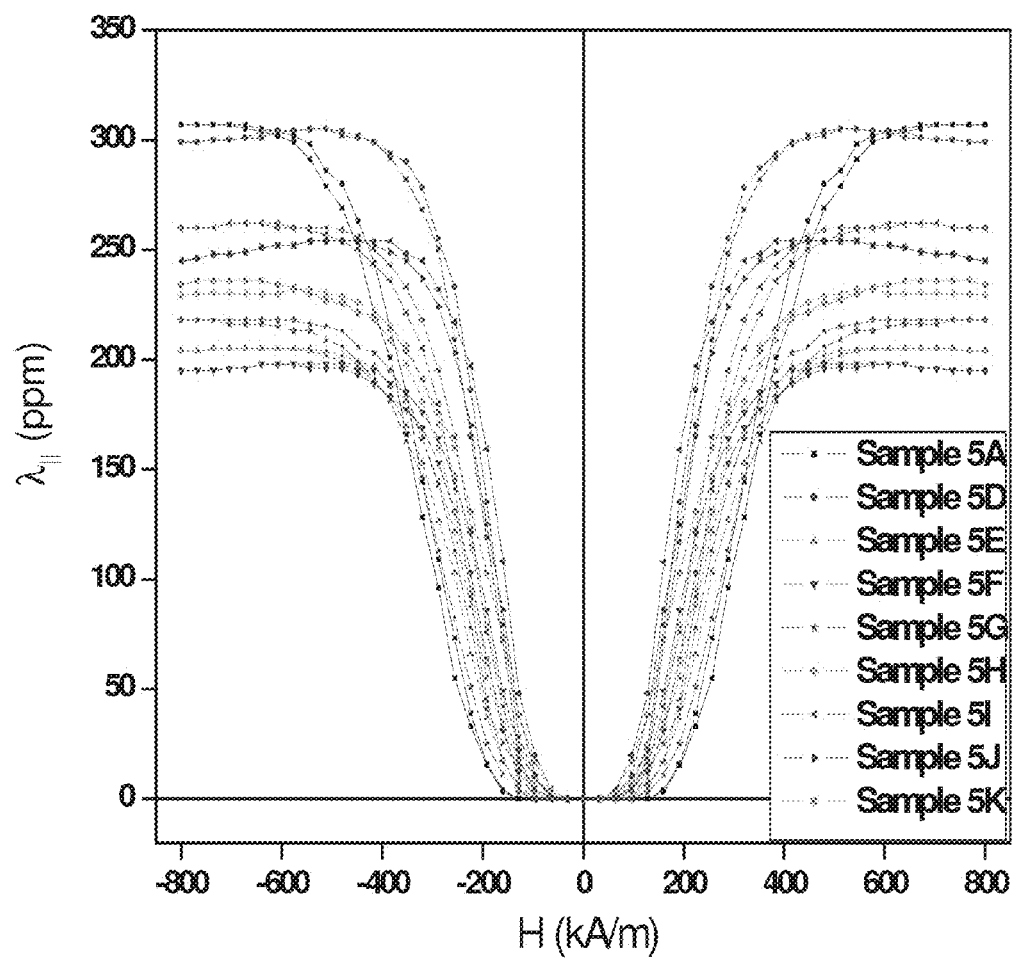
FIG. 1 relates to a graph illustrating magnetostriction curves of different samples synthesized by auto-combustion method using different total metal to glycine ratios.
 Sample 5A—1:0.125
 Sample 5D—1:0.25
 Sample 5E—1:0.375
 Sample 5F—1:0.50
 Sample 5G—1:0.625
 Sample 5H—1:0.75
 Sample 5I—1:0.875
 Sample 5J—1:1
 Sample 5K—1:1.125
Figure 2:
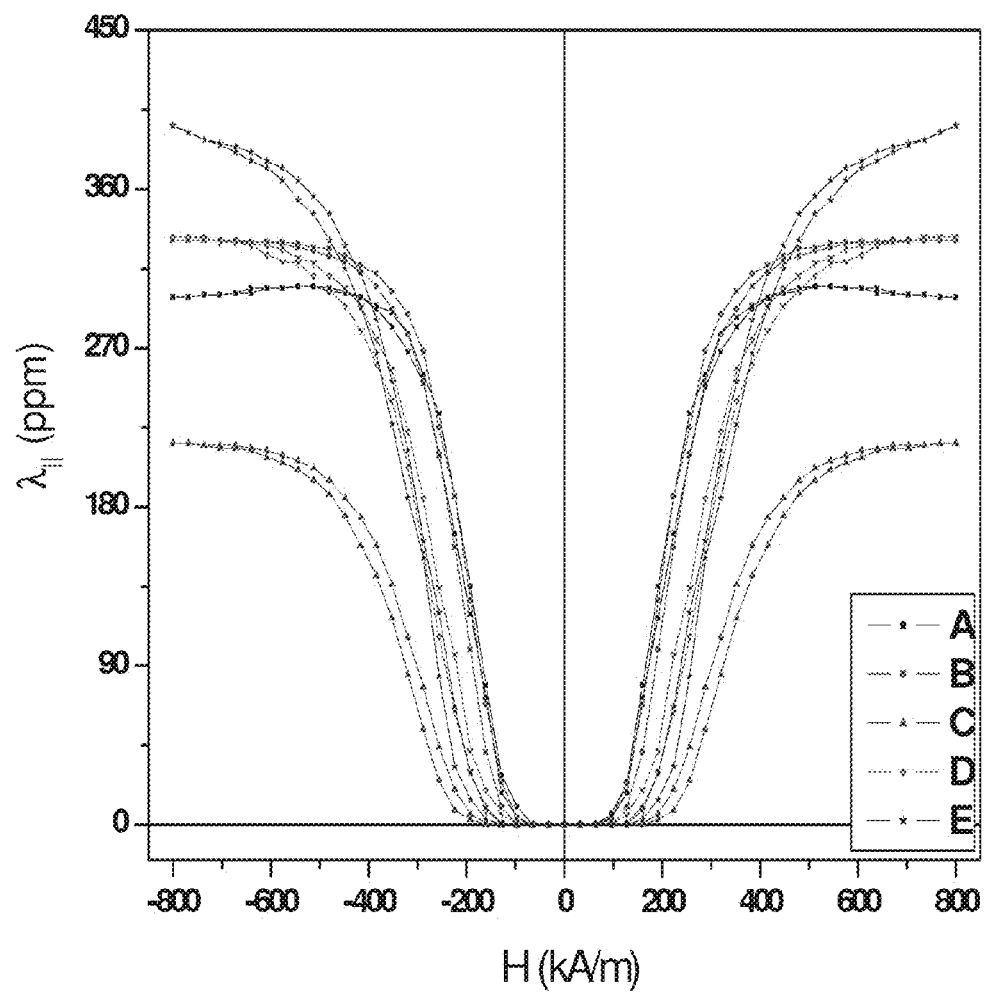
FIG. 2 relates to magnitude of magnetostriction curves of best results from the current studies:
 A—Sample 5D (single stage sintering at 1450° C. for 10 min)
 B—Sample 5D (Dual sintering 1450° C./1300° C. for 20 h)
 C—Sample 1 (single stage sintering at 1400° C. for 10 min)
 D—80% Sample 5D+20% Sample 1 (single stage sintering at 1400° C. for 10 min)
 E—80% Sample 5A+10% Sample 5D+10% Sample 1 (single stage sintering at 1450° C. for 10 min)

The present invention provides a sintered cobalt ferrite composite material with high magnetostriction comprising of nano and/or micron sized powders of cobalt ferrite, wherein the ratio of nano sized powder of cobalt ferrite to the micron sized powder of cobalt ferrite in said composite is in the ratio of about 70:30 to 95:5; the composite material having a density in the range of 79-81% and magnetostriction in the range of 340-396 ppm and maximum value of piezomagnetic coefficient is $1.9 \times 10^{-9}$ $A^{-1}$ m. The sintered cobalt ferrite composite material has a grain size of 8 μm. High magnetostriction of the cobalt ferrite composite of the current invention is observed at applied magnetic field of 800 kA/m.

The present invention provides cobalt ferrite composite material derived from nanocrystalline powders obtained by low temperature auto combustion process using glycine as fuel in variable ratios of glycine to metal ion.

In yet another aspect, the invention provides a ceramic process to obtain micron sized particles of cobalt ferrites.

The invention further relates to dual sintering of nanosized particle of cobalt ferrite obtained from auto combustion process.

The present invention provides a process for the preparation of sintered cobalt ferrite composite material comprising;
 a. Mixing nano sized powder of cobalt ferrite in amount in the range of 70% to 95% and micron sized powder of cobalt ferrite in an amount in the range of 30% to 5% in an agate mortar;
 b. Pressing the above mixture in the form of pellets; and
 c. Sintering the pellets of step (b) at a temperature in the range of 1200-1500° C. for 10 minutes to obtain the desired composite.

The magnitude of magnetostriction of sintered cobalt ferrite composites obtained by mixing different ratios of nanosized and micron sized cobalt ferrite are given in examples. The nanosized cobalt ferrite powder used in the composite is prepared by low temperature auto combustion process using glycine as fuel, using variable molar ratio of glycine to metal ion to control the morphology and obtain the desired porous structure and grain size, which forms another preferred embodiment of the current invention.

The micron sized cobalt ferrite powder used in the composite is prepared by any of the following processes:
 i. Ceramic process;
 ii. Co-precipitation process;
 iii. Citrate process;
 iv. Autocombustion process.

Heating the powders at higher temperatures give micron sized powders. The present invention relates to an improved auto combustion process using glycine as a fuel to obtain nano sized cobalt ferrite powder. The auto combustion method is very useful for synthesizing homogeneous materials at very low temperatures. This process has several advantages than the other methods of synthesis. It ensures the mixing of metal ions at a molecular level thereby leading to homogeneous powders. Also, shorter reaction times, low temperatures involved, large scale synthesis, high phase purity, fine particle nature of the products obtained, are some of the salient features of this method.

The amino acid, glycine plays two important roles in the synthesis. Firstly it forms a complex with metal ions involved, acting as a bidentate ligand. The different end groups i.e., the carboxylic group and amino group can be utilized for complex formation. The zwitter ionic character of glycine allows effective complexation with metal ions of varying ionic size. Also, it enhances the solubility of metal ions thereby avoiding selective precipitation when water is evaporated.

The main controllable processing variable is the glycine-to-nitrate ratio, which affects the flame temperature, product morphology and particle size of the resultant product. Moreover, in a preferred aspect, the invention provides auto combustion using variable molar ratio of glycine to metal ion to control the morphology and obtain the desired porous structure and grain size.

The auto combustion process uses glycine as a fuel, where the metal ion to glycine is in a molar ratio of 1:0.125 to 1:1.25 to obtain nanocrystalline cobalt ferrite powder.

The auto combustion process for the preparation of nanocrystalline cobalt ferrites comprises:

i. dissolving cobalt nitrate, $Co(NO_3)_2.6H_2O$, and Ferric nitrate, $Fe(NO_3)_3.9H_2O$ in 1:2 molar ratio, separately, in minimum amount of distilled water;
ii. dissolving Glycine separately in minimum amount of distilled water followed by adding to the solution of step (i), wherein the metal ion ($Co^{2+}$ and $Fe^{3+}$) to glycine is in the molar ratio of 1:0.125 to 1:1.25;
iii. mixing the solutions of step (i) and (ii) to obtain a homogenous solution;
iv. evaporating the mixed solution of step (iii) on a hot plate (200° C.) to obtain the thick mass which is burnt spontaneously to give cobalt ferrite powder.

Stoichiometric amounts of Cobalt nitrate, $Co(NO_3)_2.6H_2O$, and Ferric nitrate, $Fe(NO_3)_3.9H_2O$ in 1:2 molar ratio, separately, is dissolved in minimum amount of distilled water. To the solution is added glycine dissolved in minimum amount of water. A variable mole of glycine is added to per mole of the metal ion. All the three solutions are mixed and the mixed solution is evaporated on a hot plate at 200° C. After evaporation of water, the resulting thick mass is burnt spontaneously to give different sized cobalt ferrite ($CoFe_2O_4$) powder.

The different sized cobalt ferrite powders obtained from above (glycine as a fuel) are pressed into form of pellets and sintered at 1450° C. for 10 min. All the pellets are sintered under identical conditions, with a heating rate of 5° C. and cooling rate of 20° C.

The nanocrystalline cobalt ferrite powder has a particle size in the range 2-40 nm and the sintered pellets have magnetostriction in the range of 200-310 ppm.

In an aspect, the highest value of magnetostriction almost 310 ppm is obtained from the sample 5D on application of low magnetic field of 500 kA/m.

The phase purity of the samples is confirmed by X-ray diffraction studies. The crystalline size of the cobalt ferrite powder obtained by auto combustion process and the Magnetostriction, which is the relative change in the length of the sample in an applied magnetic field, measured on the sintered pellets at room temperature using strain gauge, are described in Table 6 below.

TABLE 6

| Sample Codes | As-synthesized powders | | Pellets sintered at 1450° C. for 10 min |
|---|---|---|---|
| | Metal:Glycine (Molar Ratio) | Crystallite Size (±1 nm) | Density (%) | Magnitude of magnetostriction (ppm) |
| Sample 5A | 1:0.125 | 2 | 80 | 307 |
| Sample 5B | 1:0.15 | 3 | 80 | 300 |
| Sample 5C | 1:0.2 | 3 | 80 | 304 |
| Sample 5D | 1:0.25 | 3 | 80 | 305 |
| Sample 5E | 1:0.375 | 5 | 84 | 205 |
| Sample 5F | 1:0.50 | 7 | 86 | 200 |
| Sample 5G | 1:0.625 | 14 | 85 | 218 |
| Sample 5H | 1:0.75 | 22 | 84 | 232 |
| Sample 5I | 1:0.875 | 34 | 81 | 262 |
| Sample 5J | 1:1 | 40 | 80 | 254 |
| Sample 5K | 1:1.125 | 61 | 80 | 235 |
| Sample 5L | 1:1.25 | 132 | 80 | 195 |

The magnetostriction curves of the different sintered samples are shown in FIG. 1. The magnitude of the maximum magnetostriction in the direction of the applied field for the different samples is compared in Table 6. The highest magnetostriction is obtained for the sample synthesized by lowest value of glycine used as a fuel, i.e., Sample 5A to Sample 5D.

Alternatively, the auto combustion process of the current invention uses lysine as a fuel. In the process, stoichiometric amounts of Cobalt nitrate, $Co(NO_3)_2.6H_2O$, and Ferric nitrate, $Fe(NO_3)_3.9H_2O$ in the 1:2 molar ratio, are dissolved in minimum amount of distilled water, separately. Various amounts of lysine (corresponding to different metal to lysine ratios) are also dissolved separately in minimum amount of distilled water. All the three solutions are mixed. The mixed solution is evaporated on a hot plate. After evaporation of water, the resulting thick mass is burnt spontaneously to obtain the cobalt ferrite powder.

Different sized cobalt ferrite powders are then used as the starting materials from auto combustion method with Lysine as a fuel. All the samples are pressed into form of pellets and sintered at 1450° C. for 10 min. All the pellets are sintered under identical conditions, with a heating rate of 5° C. and cooling rate of 20° C. The crystalline size of the cobalt ferrite powder and the Magnetostriction measured on the sintered pellets at room temperature using strain gauge is described in Table 7 below.

TABLE 7

| Sample Codes | As-synthesized powders | | Pellets sintered at 1450° for 10 min |
|---|---|---|---|
| | Metal:Lysine (Molar Ratio) | Crystallite Size (±1 nm) | Density (%) | Magnitude of magnetostriction (ppm) |
| Sample 4a | 1:0.2 | 12 | 85 | 276 |
| Sample 4b | 1:0.3 | 140 | 82 | 138 |

EXAMPLES

The following examples are given by way of illustration therefore should not be construed to limit the scope of the invention.

Example 1

Preparation of Nanocrystalline Cobalt Ferrite Powder (Sample 5A)

Stoichiometric amounts (1:2 molar ratio) of Cobalt nitrate, $Co(NO_3)_2.6H_2O$, and Ferric nitrate, $Fe(NO_3)_3.9H_2O$, separately, are dissolved in minimum amount of distilled water. 1 Molar solution of cobalt nitrate (1 g) and 2 Molar solution of ferric nitrate (2 g) are added to 0.125 Molar solution of Glycine (0.375 g) in minimum amount of distilled water, stirred to obtain a uniform solution. The mixed solution is evaporated at 200° C. on a hot plate. After the evaporation of water, the resulting thick mass is burnt spontaneously to obtain cobalt ferrite powder of particle size of 3 nm.

The cobalt ferrite powder is further pressed into form of pellets and sintered at 1450° C. for 10 minutes and cooled to 30° C. to obtain sintered pellets of $CoFe_2O_4$.

Example 2

Preparation of Nanocrystalline Cobalt Ferrite Powder (Sample 5B)

Stoichiometric amounts (1:2 molar ratio) of Cobalt nitrate, $Co(NO_3)_2.6H_2O$, and Ferric nitrate, $Fe(NO_3)_3.9H_2O$, separately, are dissolved in minimum amount of distilled water. 1

Molar solution of cobalt nitrate (1 g) and 2 Molar solution of ferric nitrate (2 g) are added to 0.15 Molar solution of Glycine (0.45 g) in minimum amount of distilled water, stirred to obtain a uniform solution. The mixed solution is evaporated at 200° C. on a hot plate. After the evaporation of water, the resulting thick mass is burnt spontaneously to obtain cobalt ferrite powder of particle size of 3 nm.

The cobalt ferrite powder is further pressed into form of pellets and sintered at 1450° C. for 10 minutes and cooled to 30° C. to obtain sintered pellets of $CoFe_2O_4$.

Example 3

Preparation of Nanocrystalline Cobalt Ferrite Powder (Sample 5C)

Stoichiometric amounts (1:2 molar ratio) of Cobalt nitrate, $Co(NO_3)_2.6H_2O$, and Ferric nitrate, $Fe(NO_3)_3.9H_2O$, separately, are dissolved in minimum amount of distilled water. 1 Molar solution of cobalt nitrate (1 g) and 2 Molar solution of ferric nitrate (2 g) are added to 0.2 Molar solution of Glycine (0.6 g) in minimum amount of distilled water, stirred to obtain a uniform solution. The mixed solution is evaporated at 200° C. on a hot plate. After the evaporation of water, the resulting thick mass is burnt spontaneously to obtain cobalt ferrite powder of particle size of 3 nm.

The cobalt ferrite powder is further pressed into form of pellets and sintered at 1450° C. for 10 minutes and cooled to 30° C. to obtain sintered pellets of $CoFe_2O_4$.

Example 4

Preparation of Nanocrystalline Cobalt Ferrite Powder (Sample 5D)

Stoichiometric amounts (1:2 molar ratio) of Cobalt nitrate, $Co(NO_3)_2.6H_2O$, and Ferric nitrate, $Fe(NO_3)_3.9H_2O$, separately, are dissolved in minimum amount of distilled water. 1 Molar solution of cobalt nitrate (1 g) and 2 Molar solution of ferric nitrate (2 g) are added to 0.25 Molar solution of Glycine (0.75 g) in minimum amount of distilled water, stirred to obtain a uniform solution. The mixed solution is evaporated at 200° C. on a hot plate. After the evaporation of water, the resulting thick mass is burnt spontaneously to obtain cobalt ferrite powder of particle size of 4 nm.

The cobalt ferrite powder is further pressed into form of pellets and sintered at 1450° C. for 10 min and cooled to 30° C. to obtain sintered pellets of $CoFe_2O_4$.

Example 5

Preparation of Nanocrystalline Cobalt Ferrite Powder (Sample 5J)

Stoichiometric amounts (1:2 molar ratio) of Cobalt nitrate, $Co(NO_3)_2.6H_2O$, and Ferric nitrate, $Fe(NO_3)_3.9H_2O$, separately, are dissolved in minimum amount of distilled Water. 1 Molar solution of cobalt nitrate (1 g) and 2 Molar solution of ferric nitrate (2 g) is added to 1 Molar solution of Glycine (3 g) in minimum amount of distilled water, stirred to obtain a uniform solution. The mixed solution is evaporated at 200° C. on a hot plate. After the evaporation of water, the resulting thick mass is burnt spontaneously to obtain cobalt ferrite powder of particle size of 40 nm.

The cobalt ferrite powder is further pressed into form of pellets and sintered at 1450° C. for 10 minutes and cooled to 30° C. to obtain sintered pellets of $CoFe_2O_4$.

Example 6

Preparation of Sample 1 by Ceramic Method

Stoichiometric amounts of $CoCO_3$ and $Fe_2O_3$ (1:2 molar ratio) are weighed and mixed together. The mixture is first heated at 1000° C. for 12 hours and further for 24 hours at the same temperature after an intermediate grinding. The sample is further heated at 1100° C. for 72 hours with two intermediate grindings to get the micron sized powder (1 μm). Sample 1 is pressed into the form of pellets and then sintered at 1400° C. The magnetostriction is measured on the sintered pellets at room temperature as a function of applied field using strain gages. The magnitude of magnetostriction is found to be 216 ppm.

Example 7

Preparation of Sample 1 by Ceramic Method at Different Sintering Temperature

Stoichiometric amounts of $CoCO_3$ and $Fe_2O_3$ (in the molar ratio 1:1) are weighed and mixed together. The mixture is first heated at 1000° C. for 12 hours, cooled to 30° C. and further heated for 24 hours at the same temperature after an intermediate grinding. The resulting $CoFe_2O_4$ powder (1 μm) is further heated at 1100° C. for 72 hours with two intermediate grindings.

Sample 1 is then pressed into the form of pellets and then sintered at different temperatures. The magnetostriction is measured on the sintered pellets at room temperature as a function of applied field using strain gages. The variation of the maximum magnetostriction as a function sintering temperature is shown in Table 8.

TABLE 8

| | Sample 1 | | |
|---|---|---|---|
| Temperature (° C.) | Duration (min) | Density (%) | Magnitude of magnetostriction (ppm) |
| 1450 | 10 | 89 | 151 |
| 1400 | " | 84 | 216 |
| 1300 | " | 70 | 208 |
| 1200 | " | 60 | 180 |

The magnetostriction is largest for the sample sintered at 1400° C. for 10 min and then decreases to lower values when sintering temperature is again increased and decreased from that particular temperature.

Example 8

Preparation of Sample 2 by Co-Precipitation Method

Cobalt and iron nitrates are taken in the stoichiometric ratio (1:2 molar ratio) and dissolved in distilled water. 20% of KOH solution is added drop wise to this solution under constant magnetic stirring. A precipitate formed is filtered and washed several times with distilled water until the pH is around 7. The precipitate is dried overnight in an oven at 100° C. which is eventually converted to a black powder of cobalt ferrite (5 nm).

Sample 2 is pressed into the form of pellets and then sintered at different temperatures. The magnetostriction is measured on the sintered pellets at room temperature as a function of applied field using strain gages. The variation of the maximum magnetostriction as a function of temperature is shown in Table 9 for the sintered products obtained by coprecipitation method.

TABLE 9

Sample 2

| Temperature (° C.) | Duration (min) | Density (%) | Magnitude of magnetostriction (ppm) |
|---|---|---|---|
| 1450 | 10 | 90 | 160 |
| 1300 | " | 81 | 139 |
| 1200 | " | 75 | 120 |

Example 9

Preparation of Sample 3 by Citrate Method

Stoichiometric amounts of cobalt and iron nitrates (1:2 molar ratio) are dissolved in distilled water. Water solution of citric acid is added to the metal ion solution keeping the metal to citric acid ratio as 1:2. The solution was evaporated on a water bath and finally a thick gel was formed. This precursor is dried in an oven at 100° C. and the dried precursor is calcined at 500° C. for 4 hours to get the cobalt ferrite powder (15 nm).

The corresponding powders are pelletized and sintered at different temperatures. The magnetostriction is measured on the sintered pellets at room temperature as a function of applied field using strain gages. The variation of the maximum magnetostriction as a function temperature is shown in Table 10 for the sintered products obtained by citrate method.

TABLE 10

Sample 3

| Temperature (° C.) | Duration (min) | Density (%) | Magnitude of magnetostriction (ppm) |
|---|---|---|---|
| 1450 | 10 | 80 | 216 |
| 1300 | " | 73 | 164 |
| 1200 | " | 64 | 132 |

Example 10

Preparation of Cobalt Ferrite Composite of Nanosized Powder (5D) Obtained by Example 4 and Micron Sized Powder Sample 1 Obtained by Example 6

Composites are prepared by mixing different ratios of the nanosized (3 nm) cobalt ferrite (Sample 5D), prepared by combustion method, and micron sized (1 μm) powder (Sample 1), prepared by ceramic method, in an agate mortar. All the samples are pressed in the form of pellets and sintered at 1400° C. for 10 minutes. All the pellets are sintered under identical conditions, with a heating rate of 5° C. and cooling rate of 20° C. The magnetostriction is measured on the sintered pellets at room temperature as a function of applied field using strain gages. The magnetostriction values of cobalt ferrite composites are shown in Table 1.

TABLE 1

| Sample 5D (%) | Sample 1 (%) | Temp.(° C.)/Time(min) | Density (%) | Magnitude of magnetostriction (ppm) |
|---|---|---|---|---|
| 93.75 | 6.25 | 1400/10 | 81 | 289 |
| 87.5 | 12.5 | " | 81 | 305 |
| 84 | 16 | " | 82 | 322 |
| 81.25 | 18.75 | " | 76 | 332 |
| 80 | 20 | " | 80 | 333 |
| 78 | 22 | " | 80 | 332 |
| 75 | 25 | " | 81 | 307 |
| 62.5 | 37.5 | " | 77 | 268 |
| 50 | 50 | " | 80 | 243 |
| 25 | 75 | " | 79 | 218 |

Example 11

Preparation of Cobalt Ferrite Composite of Nanosized Powder (5D) Obtained by Example 4 and (5J) Obtained by Example 5

Composite are prepared by mixing the ratios of 80% Sample 5D and 20% Sample 5J in an agate mortar. The samples are pressed in the form of pellets and sintered at different temperatures 1450 and 1400° C. for 10 minutes, with a heating rate of 5° C. and cooling rate of 20° C. The magnetostriction is measured on the sintered pellets at room temperature as a function of applied field using strain gages. The magnetostriction values of cobalt ferrite composites are shown in Table 2.

TABLE 2

| Sample 5D (%) | Sample 5J (%) | Temp.(° C.)/Time(min) | Density (%) | Magnitude of magnetostriction (ppm) |
|---|---|---|---|---|
| 80 | 20 | 1400/10 | 76 | 310 |
| 80 | 20 | 1450/10 | 80 | 314 |

Example 12

Preparation of Cobalt Ferrite Composite of Nanosized Powder (5A) Obtained by Example 1 and (5J) Obtained by Example 5

Composite are prepared by mixing different ratios of Sample 5A and Sample 5J in an agate mortar. The samples are pressed into form of pellets and sintered at 1450° C. for 10 minutes. All the pellets are sintered under identical conditions, with a heating rate of 5° C. and cooling rate of 20° C. The magnetostriction is measured on the sintered pellets at room temperature as a function of applied field using strain gages. The magnetostriction values of cobalt ferrite composites are shown in Table 3.

TABLE 3

| Sample 5A (%) | Sample 5J (%) | Temp.(° C.)/Time(min) | Density (%) | Magnitude of magnetostriction (ppm) |
|---|---|---|---|---|
| 90 | 10 | 1450/10 | 81 | 347 |
| 80 | 20 | " | 82 | 360 |

TABLE 3-continued

| Sample 5A (%) | Sample 5J (%) | Temp.(° C.)/ Time(min) | Density (%) | Magnitude of magnetostriction (ppm) |
|---|---|---|---|---|
| 85 | 15 | " | 82 | 368 |
| 70 | 30 | " | 82 | 375 |
| 60 | 40 | " | 83 | 330 |
| 50 | 50 | " | 84 | 318 |

Larger strain value of 375 ppm is observed for the composite prepared by 70% of Sample 5A and 30% of Sample 5J.

Example 13

Preparation of Cobalt Ferrite Composite of Nanosized Powder (5A) Obtained by Example 1, (5J) Obtained by Example 5 and Sample 1 Obtained by Example 6

Cobalt ferrite composites are prepared by the composition of three different particle sizes of mainly the nanosized cobalt ferrite (Sample 5D and Sample 5J), prepared by auto combustion method, and micron sized powder (Sample 1), prepared by ceramic method, in an agate mortar. All the samples are pressed in the form of pellets and sintered at 1450° C. for 10 minutes. All the pellets are sintered under identical conditions, with a heating rate of 5° C. and cooling rate of 20° C. The magnetostriction is measured on the sintered pellets at room temperature as a function of applied field using strain gages. The magnetostriction value of cobalt ferrite composites are shown in Table 4.

TABLE 4

| Sample 5A (%) | Sample 5J (%) | Sample 1 (%) | Temp.(° C.)/ Time(min) | Density (%) | Magnitude of magnetostriction (ppm) |
|---|---|---|---|---|---|
| 80 | 10 | 10 | 1450/10 | 79 | 396 |
| 80 | 5 | 15 | " | 79 | 350 |
| 80 | 15 | 5 | " | 81 | 340 |
| 70 | 10 | 20 | " | 80 | 394 |
| 70 | 20 | 10 | " | 80 | 372 |
| 60 | 20 | 20 | " | 81 | 375 |
| 60 | 10 | 30 | " | 81 | 378 |

The magnetostriction is measured on the sintered pellets at room temperature as a function of applied field using strain gauges. Larger strain close to 400 ppm is observed for the composite prepared by 80% of Sample 5A, 10% of Sample 5J and 10% of Sample 1 sintered at 1450° C. for 10 min. Further, this ratio is chosen for studies as a function of sintering temperature.

TABLE 5

| Sample 5A (%) | Sample 5J (%) | Sample 1 (%) | Temp.(° C.)/ Time(min) | Density (%) | Magnitude of magnetostriction (ppm) |
|---|---|---|---|---|---|
| 80 | 10 | 10 | 1500/10 | 84 | 324 |
| " | " | " | 1400/10 | 77 | 380 |
| " | " | " | 1300/10 | 69 | 386 |
| " | " | " | 1200/10 | 65 | 278 |

Example 14

Dual Sintering Process (Sample DS) Provide Examples for Different DS Samples as Mentioned in Table 11

In order to confirm the correlation between the grain size and magnetostriction, and role played by microstructural features, the present invention provides a dual sintering of nanosized particle of cobalt ferrite obtained from the auto combustion method using glycine as a fuel. Metal ion to glycine in the ratio of 1:0.25 is subjected to auto combustion followed by cold uniaxial pressing to form the pellets. Pellets are sintered at a higher temperature in the range of 1100-1500° C., cooled and heated at a lower temperature in the range of 1000-1400° C. for a period of 10 min-60 hrs to achieve densification without grain growth. The so obtained sintered cobalt ferrite composites exhibit magnetostriction of ~331 ppm. Table 11 lists the Magnitude of magnetostriction of the samples formed by two-step sintering experiments.

TABLE 11

Sample 5D

| Sample Name | Temperature (° C.) | | Duration (hrs) | Density (%) | Magnitude of magnetostriction (ppm) |
|---|---|---|---|---|---|
| | 1st | 2nd | | | |
| DS1 | 1450 | 1400 | 10 | 89 | 277 |
| | 1450 | 1400 | 05 | 88 | 275 |
| | 1450 | 1400 | 01 | 84 | 298 |
| | 1450 | 1400 | 0.167 | 80 | 273 |
| DS2 | 1450 | 1300 | 10 min | 79 | 245 |
| | 1450 | 1300 | 01 | 82 | 278 |
| | 1450 | 1300 | 05 | 82 | 272 |
| | 1450 | 1300 | 10 | 83 | 315 |
| | <u>1450</u> | <u>1300</u> | <u>20</u> | <u>85</u> | <u>331</u> |
| | 1450 | 1300 | 40 | 88 | 313 |
| | 1450 | 1300 | 60 | 90 | 196 |
| DS3 | 1450 | 1200 | 10 | 80 | 300 |
| DS4 | 1450 | 1100 | 10 | 80 | 301 |
| | 1450 | 1100 | 20 | 85 | 300 |
| DS5 | 1350 | 1200 | 20 | 81 | 282 |
| DS6 | 1300 | 1150 | 20 | 77 | 283 |
| DS7 | 1250 | 1100 | 01 | 62 | 203 |
| | 1250 | 1100 | 20 | 68 | 288 |
| | 1250 | 1100 | 40 | 68 | 292 |
| DS8 | 1100 | 1000 | 05 | 51 | 162 |
| | 1100 | 1000 | 20 | 56 | 229 |
| DS9 | 1500 | 1300 | 20 | 83 | 278 |

In successful two step sintering, grain size remains constant while density continuously increases, unlike in normal sintering in which final stage densification is always accompanied by rapid grain growth. Out of all the experiments, magnitude of magnetostriction value of 331 ppm is achieved for the sample sintered at 1450° C. (1$^{st}$) and then 1300° C. (2$^{nd}$). It has been found that under suitable two stage sintering condition, high value of magnetostriction and strain derivative can be achieved. This is due to the grain size and densifications of the sample are better than those obtained from single stage sintering.

Advantages of the Invention

So obtained sintered cobalt ferrite composites derived from nano and micron sized crystalline cobalt ferrite powders exhibit improved microstructure, stable grain size while continuous increase in density unlike in normal sintering, improved magnetic properties, porosity, etc. as compared to materials sintered from bulk counter parts. The improved auto combustion process using variable molar ratio of glycine as fuel provides nanocrystalline cobalt ferrite powders which after sintering exhibit high magnetostriction.

We claim:

1. Sintered cobalt ferrite composite material comprising of nano and/or micron sized powders of cobalt ferrite, wherein particle size of the nano sized powder of cobalt ferrite powder is in the range 3 to 40 nm and particle size of micron sized powder of cobalt ferrite is in the range of 1 to 10 μm, wherein the ratio of nano sized powder of cobalt ferrite to the micron sized powder of cobalt ferrite in said composite is in the ratio ranging between 70:30 to 95:5, and the ratio of nano-nano sized powder of cobalt ferrite in said composite is in the ratio ranging between 90:10 to 50:50 wherein said composite material has density in the range of 79-84% compared to theoretical density and magnetostriction is in the range of 240-400 ppm.

2. The sintered cobalt ferrite composite material according to claim 1, wherein the grain size of the sintered composite is in the range of 1 to 10 μm.

3. A process for preparation of sintered cobalt ferrite composite material as claimed in claim 1, wherein said process comprising the steps of:
 a. dissolving cobalt nitrate ($Co(NO_3)_2 \cdot 6H_2O$) and Ferric nitrate ($Fe(NO_3)_3 \cdot 9H_2O$) in the molar ratio ranging between 1:1.5 to 1:2 in minimum amount of distilled water;
 b. adding glycine solution in minimum amount of water with solution of step (a) wherein the metal ion to glycine is in the molar ratio of 1:0.125 to 1:1.25 followed by mixing to obtain a uniform solution;
 c. evaporating the solution of step (c) on a hot plate at temperature in the range of 180 to 220°C. to obtain the thick mass which is burnt spontaneously to obtain nano sized cobalt ferrite powder;
 d. mixing $CoCO_3$ and $Fe_2O_3$ in the molar ratio ranging between 1:1.5 to 1:2 followed by heating at temperature in the range of 900 to 1100° C. for period in the range of 11 to 13 hours;
 e. grinding immediately the mixture as obtained in step (d) followed by heating for period in the range of 23 to 25 hrs at temperature in the range of 900 to 1100° C.;
 f. heating the resulting powder at temperature in the range of 1000 to 1100° C. for period in the range of 70 to 72 hours with two intermediate grindings to obtain micron sized cobalt ferrite powder;
 g. mixing nano sized powder of cobalt ferrite as obtained in step (c) and micron sized powder of cobalt ferrite as obtained in step (f) in the ratio ranging between 70:30 to 95:5 to obtain mixture or mixing nano-nano sized powder of cobalt ferrite of step (c) in the ratio ranging between 90:10 to 50:50;
 h. pressing the mixture as obtained in step (g) to obtain pellets; and
 i. sintering the pellets as obtained in step (h) at a temperature in the range of 1200-1500° C. for period in the range of 5 to 60 minutes to obtain sintered cobalt ferrite composite material.

4. The process as claimed in claim 3, wherein sintered pellets of nano sized cobalt ferrite powder has magnetostriction in the range of 200 to 310 ppm.

5. The sintered cobalt ferrite composite material according to claim 1, wherein nano sized cobalt ferrite powder is prepared by an auto combustion process using glycine as a fuel, wherein the metal ion to glycine is in a molar ratio of 1:0.125 to 1:1.25.

6. A process for preparation of nano sized cobalt ferrite powder of claim 1, comprising dual sintering of nano sized cobalt ferrite powder prepared by auto combustion process, said process comprising;
 a. mixing metal ion, glycine in a molar ratio of 1:0.25 and subjecting to auto combustion followed by cold uniaxial pressing to form the pellets and
 b. dual sintering at temperature in the range of 1100 to 1500° C., cooling, heating at lower temperature in the range of 1000-1400 ° C. for a period in the range of 10 to 60 hours to obtain dual sintered cobalt ferrite composites.

\* \* \* \* \*